(12) United States Patent
Lansbergen

(10) Patent No.: US 9,540,538 B2
(45) Date of Patent: Jan. 10, 2017

(54) DRIER FOR ALKYD RESIN COMPOSITIONS

(75) Inventor: Adrianus Jozephus Henricus Lansbergen, Zwolle (NL)

(73) Assignee: SYNRES B.V., Hoek Van Holland (NL)

( * ) Notice: Subject to any disclaimer, the term of this patent is extended or adjusted under 35 U.S.C. 154(b) by 98 days.

(21) Appl. No.: 14/123,306

(22) PCT Filed: May 31, 2012

(86) PCT No.: PCT/EP2012/060214
§ 371 (c)(1),
(2), (4) Date: Feb. 24, 2014

(87) PCT Pub. No.: WO2012/163999
PCT Pub. Date: Dec. 6, 2012

(65) Prior Publication Data
US 2014/0155514 A1    Jun. 5, 2014

(30) Foreign Application Priority Data
Jun. 1, 2011 (EP) .................... 11168412

(51) Int. Cl.
*C09D 177/12* (2006.01)
*C09D 167/08* (2006.01)
*C09D 167/00* (2006.01)

(52) U.S. Cl.
CPC .......... *C09D 177/12* (2013.01); *C09D 167/00* (2013.01); *C09D 167/08* (2013.01)

(58) Field of Classification Search
CPC .... C09D 177/12; C09D 167/00; C09D 167/02
See application file for complete search history.

(56) References Cited

U.S. PATENT DOCUMENTS

| | | | |
|---|---|---|---|
| 3,781,214 A | 12/1973 | Nemoto et al. | |
| 4,076,765 A * | 2/1978 | Nakahara | C08G 59/42 525/507 |
| 4,981,887 A * | 1/1991 | Ruhoff | C09D 5/4423 204/500 |
| 5,510,452 A * | 4/1996 | Santhanam | C08G 63/6854 528/291 |
| 5,536,871 A * | 7/1996 | Santhanam | C08G 63/6854 560/196 |
| 6,387,496 B1 * | 5/2002 | Van Benthem | C08G 63/6854 428/402 |
| 6,548,565 B1 * | 4/2003 | Van Den Berg | C08G 63/48 522/104 |
| 8,999,494 B2 * | 4/2015 | Derks | C08G 69/44 427/358 |
| 9,416,295 B2 * | 8/2016 | Tennebroek | C09D 133/14 |
| 2009/0191412 A1 * | 7/2009 | Van Benthem | C08G 69/44 428/423.1 |
| 2011/0086953 A1 * | 4/2011 | Tennebroek | C08G 18/283 524/104 |
| 2011/0118394 A1 * | 5/2011 | Van Casteren | C08G 18/283 524/104 |
| 2012/0157617 A1 * | 6/2012 | Van Benthem | C08G 69/44 524/602 |
| 2012/0183749 A1 * | 7/2012 | Derks | C08G 69/44 428/195.1 |
| 2013/0296486 A1 * | 11/2013 | Tennebroek | C08G 18/283 524/602 |

FOREIGN PATENT DOCUMENTS

| | | | |
|---|---|---|---|
| EP | 0 328 323 | 8/1989 | |
| EP | 1 505 130 | 2/2005 | |
| NL | EP 1048706 A1 * | 11/2000 | .......... C09D 167/08 |
| WO | WO 03/074466 | 9/2003 | |
| WO | WO 03/102095 | 12/2003 | |
| WO | WO 2006/020818 | 2/2006 | |

OTHER PUBLICATIONS

Database CA, Chemical Abstracts Service, May 1984, Michihiko et al, "Light-curable coating compositions", XP002659687, 2 pgs.
International Search Report for PCT/EP2012/060214, mailed Jun. 27, 2012.
Written Opinion for PCT/EP2012/060214, mailed Jun. 27, 2012.

* cited by examiner

*Primary Examiner* — Sanza McClendon
(74) *Attorney, Agent, or Firm* — Nixon & Vanderhye P.C.

(57) ABSTRACT

The invention relates to an alkyd resin composition comprising components: (A) at least an auto-oxidisable alkyd resin component comprising unsaturated fatty acid or its derivative, selected from: (i) alpha, beta-unsaturated ester-functional alkyd resin; (ii) combination of a alpha, beta-unsaturated ester functional material and an alkyd resin; and (iii) mixture of components (i) and (ii); Wherein the alkyd has an oil length of at least 20% unsaturated fatty acids; (B) a daylight photoinitiator; (C) a metal drier; and (D) optionally a liquid medium selected from the group consisting of an organic solvent, water, non-volatile diluent and mixtures thereof; wherein if the liquid medium is present and is: a) substantially based on organic solvent and/or diluent then the VOC is <300 g/l, or b) substantially based on water then the VOC is <100 g/l.

14 Claims, No Drawings

DRIER FOR ALKYD RESIN COMPOSITIONS

This application is the U.S. national phase of International Application No. PCT/EP2012/060214 filed 31 May 2012 which designated the U.S. and claims priority to EP Patent Application No. 11168412.2 filed 1 Jun. 2011, the entire contents of each of which are hereby incorporated by reference.

The invention is concerned with high solids content alkyd based compositions comprising alpha, beta-unsaturated ester functionality; to a method of preparing such compositions and to the use of the coating compositions according to the invention as indoor or outdoor coatings.

Alkyd resins are one of the most common binders used for ambient-cure, solvent-based coatings. The resistance properties of traditional solvent-borne alkyd resins are developed via auto-oxidative crosslinking of the alkyd film. Crosslinking occurs when the activated methylene groups in the unsaturated fatty acids or oils of the alkyd are oxidized in air to give hydroperoxides, which subsequently decompose to generate free radicals, resulting in oxidative crosslinking. This oxidative crosslinking process is commonly accelerated by adding driers. However, alkyd resins have relatively slow "dry" and/or cure times, particularly at ambient temperatures. Various modifications have been made to alkyd resins to address such limitations.

One such attempt includes polymerization of an alkyd resin with a (meth)acrylic functional compound, such as (meth)acrylic acid ester, via a reaction in which the (meth) acrylic unsaturation is not consumed. Methods for modifying alkyds with (meth)acrylic functionality are known in the art. Methacrylate modified alkyds, prepared by reacting hydroxyfunctional alkyd with isocyanate functional methacrylate or with diisocyanate and hydroxyalkylmethacrylate are described in EP 175097. Acrylate modified alkyds, prepared by the same procedure using hydroxyacrylate, were disclosed by U.S. Pat. No. 7,387,843. WO 2006/020818 discloses methacrylated sucrose fatty esters, prepared by various procedures, among which is direct esterification of sucrose fatty ester alcohol with methacrylic anhydride. Various prior art documents disclose the reaction products of glycidyl(meth)acrylate and alkyd. For example EP 1194493 discloses the combination of an alkyd with an acid/anhydride and glycidyl methacrylate (GMA); U.S. Pat. No. 7,060,745 discloses waterborne alkyds in combination with acid/anhydride and 3 to 13% GMA; EP 1495082 discloses alkyds having an acid value <10 mg KOH and 1 to 5% GMA and U.S. Pat. No. 6,946,509 discloses GMA functionalised alkyd with Ca based drier for improved drying properties.

For example, carboxylic functional alkyds can be prepared in situ by reacting a hydroxyl functional alkyd (P) with an anhydride having functionality R=H or COOH as a first step and then reacted with glycidyl methacrylate (GMA) in a second step as shown below in formula (I).

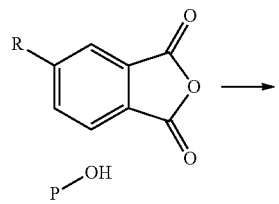

(1)

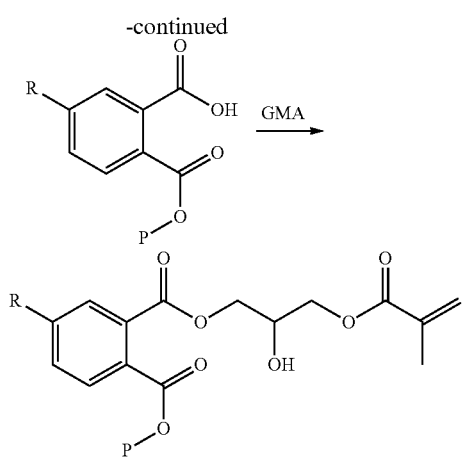

The (meth)acrylate functional alkyd resins of the prior art can be used in solvent borne decorative paints and show properties like improved drying and through drying behavior, increased hardness and less yellowing tendency. (Meth) acrylic modified alkyd resins generally have a higher molecular weight and a higher Tg, producing coatings with reduced tack-free time (via solvent evaporation).

An issue with known (meth)acrylate functional alkyd resins is that the drying behavior is not yet on the level required for commercial applications. Especially ultra-high solids coating compositions show slow drying and lack of hardness. With (meth)acrylate modification the hardness is improved at a certain extent, but the drying speed is still very slow.

It is known in the prior art that photoinitiators can be used to speed up curing time of auto-oxidative alkyd resins. For example U.S. Pat. No. 7,387,843 discloses urethane alkyds with acrylate groups built in via isocyanate chemistry and cured by UV-cure as well as oxidative drying at elevated temperatures. However, U.S. Pat. No. 7,387,843B relates to a low solids content system (20-40%). The advantage of low solids content is that resins with fast physical drying can be used, which in combination with the solvent evaporation will give tack-free coatings in short time. Furthermore the systems described in U.S. Pat. No. 7,387,843 are subjected to enhanced drying mechanisms through both heat and UV irradiation to speed up the physical and chemical drying.

However, there was until now no solution found for high solids content alkyd based coating compositions that are to be used in decorative applications without possibility to artificially use heat or UV radiation other than ambient (day) light. Such high solids compositions inherently have high viscosity (being thus difficult to coat), and have less of the fast physical drying mechanism.

JP 48085628 describes a modified alkyd resin using glycidyl acrylate, glycidyl methacrylate, or its derivative. Drying oil-modified alkyd resins having carboxyl groups and an oil length of 20-80 are treated with glycidyl acrylate, glycidyl methacrylate, or its derivative, in the presence of a polymerization inhibitor. The resulting resin is mixed with a photosensitizer or photoinitiator to give a coating composition which hardens with UV irradiation. However, the resin compositions disclosed are not suitable for ambient oxidative-cure, high-solids coating applications since large equipments with special UV light lamps are needed that function with high energy consume and under well defined environmental conditions. This is in contrast with the outdoor drying of auto-oxidative decorative coatings under uncontrolled conditions, for which the UV curing mechanism is not suitable.

Obviously, there remains a need for a high solids content alkyd resin composition which can easily dry in- or outdoor at ambient temperature and in normal daylight conditions, which composition when formulated with additional additives, is commercially viable for ambient oxidative-cure, fast-drying coatings.

It is the object of the present invention to provide an alkyd resin composition that has a good drying behaviour, especially with regard to the dust-free and/or tack-free drying times. Preferably the dust-free and/or tack-free drying times amount less than 4 hours.

Surprisingly, we have found that according to the present invention a fast drying alpha, beta-unsaturated ester modified alkyd resin composition may be obtained by the addition of a daylight photoinitiator (alone or in combination with driers).

This is surprising, as the combination of daylight and high solids alpha, beta-unsaturated ester-functional alkyd resin based coating compositions was until now not considered.

According to the invention there is provided an alkyd resin composition comprising components:
(A) at least an auto-oxidisable alkyd resin component comprising unsaturated fatty acid or its derivative, selected from:
 (i) alpha, beta-unsaturated ester-functional alkyd resin;
 (ii) combination of a alpha, beta-unsaturated ester functional material and an alkyd resin; and
 (iii) mixture of components (i) and (ii);
Wherein the alkyd has an oil length of at least 20%, preferably at least 30%, more preferably at least 50% and most preferably at least 60% unsaturated fatty acids;
(B) a daylight photoinitiator;
(C) a metal drier; and
(D) optionally a liquid medium selected from the group consisting of an organic solvent, water, non-volatile diluent and mixtures thereof;
wherein if the liquid medium is present and is: a) substantially based on organic solvent and/or diluent then the VOC is <300 g/l, or b) substantially based on water then the VOC is <100 g/l.

Herein by substantially it is meant that the organic solvent in case a) and the water in case b) amounts at least 60 wt %, more preferably at least 80 wt % and most preferably at least 95 wt % based on the total liquid medium content in the alkyd resin composition according to the invention.

The singular forms "a, "an," and "the" includes the plural, unless the context clearly dictates otherwise.

Driers for paints and varnishes are compounds used as catalysts to promote the auto-oxidative curing of the films.

By room or ambient temperature herein is mean a temperature in a range of from 0 to 35° C., more preferably from 5 to 27° C. and most preferably from 10 to 25° C.

Preferably the alkyd resin composition is a room temperature air-drying or auto-oxidisable alkyd resin.

In an embodiment according to the invention, the alkyd resin component (A) is a alpha, beta-unsaturated ester-functional alkyd resin (i). The alpha, beta-unsaturated ester-functional alkyd resin (i) is an alkyd resin containing reactive alpha, beta-unsaturated ester functional groups or moieties. A alpha, beta-unsaturated ester-functional alkyd resin (i) can generally be the reaction product of components comprising:
(I) an alkyd resin having suitable functionality to react with (II) and/or (III), and
(II) a alpha, beta-unsaturated ester having suitable functionality to react with (I) and/or (III), and
(III) optionally a bridging component having suitable functionality to react with (I) and (II),
wherein the reaction product contains terminal and/or pendant reactive alpha, beta-unsaturated ester functional groups or moieties.

Therefore, within the terms of the invention is to be understood that by alpha, beta-unsaturated ester-functional alkyd resin (i) it is meant any type of alkyd resin that also contains terminal and/or pendant reactive alpha, beta-unsaturated ester functional groups or moieties.

Preferably the alkyd resin (I) is a carboxyl- or a hydroxyl-functional alkyd.

Preferably the alpha, beta-unsaturated ester functionality is derived from the following conjugate acid (CA):

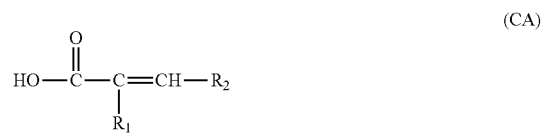

(CA)

wherein one of R1 or R2 is H and the other C1 to C8 alkyl or C2 to C4 alkylene. More preferably R1 is H and R2 is CH=CH—CH3; or one of R1 or R2 is CH3 and the other is H. Most preferably the alpha, beta unsaturated ester is a methacrylate. By alpha, beta-unsaturated ester functionality having structure (CA) it is herein also meant to include derivatives such as ester components derived from structure (CA) obtained by (trans)esterification of conjugated esters, anhydrides or acid chloride based components derived from the structure (CA).

Preferably the auto-oxidisable alkyd resin component (A) comprises at least one (CA) derived moiety.

Such alpha, beta-unsaturated esters are for example epoxy-functional alpha, beta-unsaturated esters.

Suitable methacrylates (II) for functionalizing the alkyd resin (I) include tert-butyl methacrylate, methyl methacrylate, 2-hydroxypropyl methacrylate, 4-hydroxybutyl methacrylate, 2-hydroxyethyl methacrylate, glycidyl methacrylate, 2-isocyanatoethyl methacrylate, methacrylic acid, methacrylic acid anhydride, and the like, which may be incorporated into the alkyd resin, for example, by urethane formation, esterification, or transesterification.

Examples of the bridging component (III) are difunctional ester, anhydride, isocyanate and epoxy compounds.

In particular, the alpha, beta-unsaturated ester-functional alkyd resin (i) is preferably the reaction product of: (I-1) a carboxyl-functional alkyd resin, and (II-1) an epoxy methacrylate, wherein the epoxy moiety of the methacrylate is the reactive moiety and the reaction product contains terminal and/or pendant reactive methacrylate functional groups.

In a preferred embodiment, the alpha, beta-unsaturated ester-functional alkyd resin (i) may comprise for example the reaction product of (a) a carboxyl-functional alkyd resin and (b) a glycidyl methacrylate. The resulting reaction product contains terminal and/or pendant reactive methacrylate functional groups or moieties.

In a preferred embodiment of the invention, the alpha, beta-unsaturated ester-functional alkyd resin (i) comprises the reaction product of:
(a1) 85 to 98 wt %, based on the total composition, of an alkyd resin and (a2) 2 to 15 wt %, based on the total composition, of a methacrylate, wherein the wt % are based on the total weight of resin (i), and wherein the epoxy moiety of the methacrylate is the reactive moiety and the reaction product contains terminal and/or pendant reactive methacrylate functional groups.

In another preferred embodiment, the methacrylate-functional alkyd resin (i) comprises the reaction product of a carboxyl-functional alkyd resin, and an epoxy methacrylate, wherein the epoxy moiety of the methacrylate is the reactive moiety and the reaction product contains terminal and/or pendant reactive methacrylate functional groups, and wherein the carboxyl-functional alkyd resin comprises the reaction product of:
- (a) 0 to 30 wt % of one or more diol(s);
- (b) 10 to 40 wt % of one or more polyol(s);
- (c) 5 to 40 wt % of one or more polyacid(s);
- (d) 0 to 15 wt % of one or more monofunctional acid(s) or hydroxyacid(s);
- (e) 30 to 80 wt % of one or more fatty acid(s), fatty ester(s), or naturally occurring oil(s); and
- (f) 0 to 1 wt % of a catalyst;

where (a)+(b)+(c)+(d)+(e)+(f) make up 100%.

Alkyd resins (I) suitable for the invention are alkyd resins which are generally known in the coatings field and which typically are prepared by one of the following three general methods:
(1) The alkyd resin (I) may usually be prepared by heating a polybasic acid and a polyfunctional alcohol with a polyol alcoholysis reaction product. The polyol alcoholysis reaction product is an oil, or an oil derivative, modified by ester interchange with a polyfunctional alcohol in order to form esters having an average hydroxyl functionality of two. The polyol alcoholysis reaction product contains hydroxyl groups. It is to be understood that the statistical occurrence of the various reaction products may include some constituents of the polyol reaction product which do not contain hydroxyl groups, but the mean product will contain hydroxyl groups. The oil is preferably selected from the group consisting of a drying oil, a semi-drying oil, a mixture thereof and a mixture of at least one of the drying oils or the semi-drying oils with a non-drying oil.
(2) The alkyd resin (I) may also be prepared by first reacting a free fatty acid with a polyfunctional alcohol to form esters having an average hydroxyl functionality of two. These esters are then admixed with the polybasic acid and the polyfunctional alcohol and the mixture heated to form the alkyd resin.
(3) It is also possible to obtain the alkyd resin (I) by mixing the fatty acid and the polyfunctional alcohol or an alkanolamine with the polybasic acid and heating the mixture to reaction temperature.

According to an embodiment of to the invention, the alkyd resin (I) is preferably the reaction product of (a) 0 to 30 wt %, based on the total composition, of a diol, (b) 10 to 40 wt %, based on the total composition, of a polyol and/or a polyalkanolamine, (c) 5 to 40 wt %, based on the total composition, of a polyacid, (d) 0 to 15 wt %, based on the total composition, of a monofunctional acid, (e) 30 to 80 wt %, based on the total composition, of a fatty acid, fatty ester or naturally occurring oil and, optionally, (f) a catalyst.

The polyol (b) used in the preparation of the alkyd resin itself or the monobasic fatty acid or fatty ester is preferably selected from aliphatic, alicyclic, and aryl alkyl polyols or polyalkanolamines. Suitable examples of polyols include, but are not limited to, trimethylolpropane (TMP), pentaerythritol (PE), trimethylolethane, erythritol, threitol, dipentaerythritol, sorbitol, glycerine, and the like. Preferably, the polyol is trimethylolpropane (TMP) or pentaerythritol (PE). Suitable examples of polyalkanolamines include, but are not limited to diisobutanolamine, diisopropanolamine and diethanolamine.

In addition to the polyol, a diol (a) may be used in the preparation of the alkyd resin. Examples of suitable diols include, but are not limited to, neopentyl glycol (NPG), ethylene glycol, propylene glycol, diethylene glycol, triethylene glycol, tetraethylene, glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, and hydrogenated bisphenol A. Preferably, the diol is neopentyl glycol (NPG).

The polyacid (c) (preferably dicarboxylic acid and/or tricarboxylic acid) and monofunctional acid (d) (preferably a monocarboxylic acid) components of the alkyd resin may be any polyacid or monofunctional acid known in the art used in the formation of an alkyd resin. The dicarboxylic acid may be, for example, isophthalic acid, phthalic anhydride (acid), terephthalic acid, adipic acid, tetrachlorophthalic anhydride, dodecanedioic acid, sebacic acid, azelaic acid, 1,4-cyclohexanedicarboxylic acid, 1,3-cyclohexanedicarboxylic acid, maleic anhydride, fumaric acid, succinic anhydride, succinic acid, 2,6-naphthalenedicarboxylic acid, glutaric acid, and the like. Preferably, the dicarboxylic acid is isophthalic acid, phthalic anhydride or phthalic acid. The tricarboxylic acid may be, for example, trimellitic anhydride. A monofunctional acid (d) may also be used such as, for example, benzoic acid, acetic acid, propionic acid and butanoic acid.

The monobasic fatty acid or fatty ester oil (e) may be prepared by reacting an oil or a fatty acid with a polyol. Examples of suitable oils include sunflower oil, canola oil, dehydrated castor oil, coconut oil, corn oil, cottonseed oil, fish oil, linseed oil, oiticica oil, soya oil, tung oil, animal grease, castor oil, lard, palm kernel oil, peanut oil, perilla oil, safflower oil, tallow oil, walnut oil, and the like. Suitable examples of fatty acids alone or as components of oil include, but are not limited to, tallow acid, soya acid, myristic acid, linseed acid, versatic acid, coconut acid, tall oil fatty acid, rosin acid, neodecanoic acid, neopentanoic acid, isostearic acid, 12-hydroxystearic acid, cottonseed acid, and the like. When alpha, beta-unsaturated ester-functional alkyd resins are formulated with conjugated fatty acids or oils or when the alkyds contain conjugated fatty acids or oils, the drying times are faster than when conjugated fatty acids or oils are absent from the formulation.

Optionally, a catalyst (f) may be used to promote the formation of an alkyd resin. The catalyst may be any catalyst known in the art used in the formation of an alkyd resin. Preferably, the catalyst is an acid catalyst such as, for example phosphoric acid. The amount of catalyst added promotes the formation of an alkyd resin, as described above, and may be determined by routine experimentation as understood by those skilled in the art. Preferably, a catalyst is added in amounts ranging from 0.01-1.00 wt % based on the amount of reactants.

In a preferred embodiment of the invention in which the alkyd resin is reacted to glycidyl methacrylate only, the non-modified alkyd resin has an acid number in a range of 10 to 80 mg KOH/g, more preferably 20 to 60 mg KOH/g, and most preferably 30 to 50 mg KOH/g. The non-modified alkyd resin has a preferred number average molecular weight Mn in a range of from 700 to 6500 g/mol, more preferably from 2000 to 5000 g/mol. Preferably the alkyd resin (A) has an oil length of 50% or more. The oil length is defined as the number of grams of fatty acid (expressed as its triglyceride) used to produce 100 g of the alkyd resin.

According to a preferred embodiment of the invention the alkyd (I) to be modified with α,β-unsaturated ester is a polyesteramide alkyd comprising 10 to 40 wt % cyclic anhydride, 10 to 40 wt % alkanolamine and 30 to 80 wt % fatty acid based on the total amount of polyesteramide alkyd. It can be obtained in a two step process by reaction of a cyclic anhydride with an alkanolamine to form a β-hydroxyalkylamide, after which a polyesteramide is obtained through polycondensation. In the second step fatty acids are added which esterify with the β-hydroxyalkylamide groups on the polyesteramide. The alkyd can also be prepared in a one step process in which the anhydride, alkanolamine and fatty acid are polycondensed all together. In a further step direct modification of the polyesteramide with α,β-unsaturated carboxylic acid is possible by water removal at a temperature from 120 to 180° C.

According to another preferred embodiment of the invention there is also provided a urethane modified alkyd resin, i.e. an uralkyd resin, which is the reaction product of components comprising: (a') a hydroxyl containing, alkyd resin having an oil length of between 20% and 70%; and (b') an isocyanate-functional compound.

Preferably, the isocyanate-functional compound (b') is present in said resin in an amount from 1 to 40% by weight of the solids of said alkyd. The useful isocyanates are any known isocyanates which, when reacted with the hydroxyl containing alkyd resin forms a urethane modified alkyd resin. This alkyd resin can be further modified to contain methacrylate functional groups or moieties. The method of preparation of the urethane modified alkyd resin groups is according to any method known in the art.

In an embodiment of the invention the alpha, beta-unsaturated ester modified alkyd resin (i) is preferably prepared by reacting a carboxyl-functional alkyd with a methacrylate. The alpha, beta-unsaturated ester-functional alkyd resin (i) may also be prepared by first reacting a hydroxyl-functional alkyd resin with an acid anhydride to produce a carboxyl-functional alkyd resin, and reacting the carboxyl-functional alkyd resin with a methacrylate, to produce a methacrylate-functional alkyd resin (i), as described above. The methacrylate-functional alkyd resin may be prepared at a temperature range from 100 to 170° C., preferably from 115 to 165° C. and most preferably from 125 to 155° C. Optionally, a catalyst capable of promoting the reaction between oxirane and carboxyl functionalities may be used.

The alpha, beta-unsaturated ester-functional alkyd resin (i) may also be prepared by reacting an alkyd with alpha, beta unsaturated ester via transesterification at a temperature range from 100 to 180° C.; with (alpha, beta unsaturated ester via esterification at a temperature range from 150 to 200° C.; or by reacting an alkyd with an isocyanate having alpha, beta unsaturated ester functionality via urethane formation at a temperature range from 25 to 150° C. Suitable catalysts commonly used for such reactions may also be added.

The alpha, beta-unsaturated ester-functional alkyd resin (i) may also be obtained via other reaction schemes than presented above, that is, other sources of alpha, beta unsaturated ester functionality are also suitable for use according to the invention. Thus, an epoxide group is not strictly necessary in the alpha, beta-unsaturated ester, so long as some means for appending the alpha, beta-unsaturated ester to the alkyd resin is available, which means preserves the alpha, beta-unsaturated ester functionality.

The alkyd resin component (A) may be (ii) a combination of alpha, beta-unsaturated ester functional material and any alkyd resin. Preferably the alkyd resin is an alkyd resin (I) as described above.

By alpha, beta-unsaturated ester functional material herein is meant a polymer, an oligomer or a monomer.

The alpha, beta-unsaturated ester functional material may include suitable polymer backbones other than an alkyd resin. The total amount of the alpha, beta-unsaturated ester functional groups in such a blend is preferably 1 to 25 wt %, more preferably 2 to 20 wt %, and most preferably 4 to 15 wt %. Such alpha, beta-unsaturated ester functional material could e.g. be vinyl polymers, polyesters, epoxy polymers, fluorine containing polymer or other polyurethane and/or hybrids of any of the preceding polymers such as polyurethane/acrylics and uralkyds.

The auto-oxidisable alkyd resin component (A) may also be a combination of components (i) and (ii).

If desired, the alkyd resin component (A) according to the invention may also be used in combination with other polyesters or/and polymer compositions which are not according to the invention to obtain mixtures with improved drying.

In one embodiment, the invention relates to alkyd resin compositions that include an alpha, beta-unsaturated ester-functional alkyd resin and a drier or mixture of drier salts comprising in the range of from 500 to 100,000 ppm of dissolved metal by weight of the total resin solids.

Preferably, the amount of dissolved drier salt is from 1000 to 50,000 ppm metal by weight of total resin solids and more preferably from 500 to 5000 ppm by weight of total resin solids. Most preferably, the amount of dissolved metal of the metal salt drier is from 5000 to 10,000 ppm by weight of total resin solids.

The drier may be any drier known in the art. Examples of suitable driers include, but are not limited to, various salts of cobalt, zirconium, calcium, zinc, lead, iron, cerium, aluminum, and manganese. An especially suitable drier is a cobalt drier. Mixtures of driers (i.e. a drier system) may also be used. The driers typically are used as octoates or naphthenates, in an amount of from 0.005-5.0 wt % metal, based on the alkyd resin. Examples of commercial products include Nuodex calcium 5, Nuodex cobalt 10, Nuodex Combi BSR, Nuodex zirconium 12 and Nuodex WEB combi AQ sold by Rockwood Pigments UK Durham. A description of metal driers, their functions, and methods for using them may be found, for example, in Handbook of Coatings Additives, p. 496-506, ed. by L. J. Calbo, Marcel Dekker, INC. New York, N.Y., 1987.

Daylight (ambient light) photoinitiators are organic or organometallic compounds that on exposure to conventional sources of light (such as sun light or lamps) undergo a photoreaction to produce reactive species. Preferably the photoinitiators are able to produce the reactive species under the influence of visible light and/or ultraviolet light. Sources of light are available in the form of conventional light bulbs, fluorescent tubes or the sun. Preferably the reactive species produced by the photoinitiator are free radicals.

Suitable examples of organic photoinitiators that produce free radicals include ketones, such as methyl ethyl ketone, 1-hydroxy cyclohexyl phenyl ketone, 2-hydroxy-2-methyl-1-phenyl propan-1-one, acetophenone, benzophenone, 4-aminobenzo-phenone, 4,4'-diaminobenzophenone, 4,4'-bis(dimethyl amino)benzophenone, valero phenone, hexanophenone, o-methoxybenzophenone, α-phenyl butyrophenone, γ-phenyl butyrophenone, p-morpholinopropiophenone, di-benzosuberone, 4-morpholinopropiophenone, 4-methoxyacetophenone, 4-diacetyl benzene, 1,3,5 triacetyl benzene; diketone compounds such as benzil, camphorquinone, 1-phenyl-1,2-propanedione, 2,3-butanedione, acenaphtenequinone, isatin, and α-Diketodibenzosuberane; benzoin compounds such as benzoin, benzoin methyl ether and ethyl ether; quinone and anthrone compounds such as hydroquinone, anthraquinone, naphthoquinone, acenaphthenequinone and 3-methyl-1,3-diazo-1,9-benzanthrone; phenolic compounds such as 2,4-dinitrophenol; phosphine compounds such as triphenyl phosphine and tri-o-tolyphosphine; azo compounds such as azobisbutyronitrile; thioxanthone and 2-chlorothioxanthone.

Phosphine oxide photoinitiators are preferred. Suitable examples include 2,4,6-trimethyl benzoyldiphenyl phosphine oxide, bis(2,6-dimethoxybenzoyl)-2,4,4-trimethyl pentyl phosphine oxide. More preferred are the acyl phosphine oxide photoinitiators such as mono-, bis- and tris-acyl phosphine oxide and mixtures thereof. Even more preferred are the bisacyl phosphine oxide photoinitiators with bis(2, 4,6-trimethylbenzoyl)-phenyl-phosphine oxide (available from Ciba Specialty Chemicals as Irgacure 819) being most preferred.

Suitable examples of organometallic photoinitiators include (5-cyclopentadienyl)-bis(2,6-difluoro-3-[pyrr-1-yl] phenyl titanium, also known as Irgacure 784; and cyclopentadienyl(cumenyl)iron hexafluorophosphate, also known as Irgacure 261.

Tertiary amines are commonly used as coinitiators with Norrish Type II organic photoinitiators. Suitable examples include 2-(Dimethylamino)ethanol, 1-(Dimethylamino)-2-propanol, Methyldiethanolamine, 2-Ethylhexyl 4-(dimethylamino)benzoate, Ethyl 4-(dimethylamino)benzoate, 4,4'-Bis(diethylamino)benzophenone, Isoamyl 4-(dimethylamino)benzoate, and the like.

Preferably, the amount of photoinitiator should be from 0.01 to 5 weight % based on the 100% liquid coating composition, more preferably from 0.1 to 2 weight % and most preferably from 0.5 to 1.5 weight %.

After preparation the alkyd resin component (A) is usually dissolved or dispersed in a liquid medium. By liquid medium herein is meant an organic solvent and/or organic co-solvent, a non-volatile diluent, water or even a mixture of an aqueous and organic medium that may be partially or completely soluble in water. If the liquid medium is substantially based on water, it is preferred that the oil length of the alkyd resin component is at least 35%.

By non-volatile diluent herein is meant an inactive ingredient added to decrease the viscosity of the resin which is not an alkyd resin, nor an alpha, beta-unsaturated ester functional diluent. Preferably the non-volatile diluent comprises fatty acid moieties. The non-volatile diluent may be air drying (i.e. auto-oxidisable) or non-air drying diluent. Preferably the diluent is a non-volatile, auto-oxidisable diluent. Examples of suitable air drying, fatty acid based non-volatile diluents are methylesters of tung oil fatty acid or calenduly fatty acid; fatty acid esters of polyols such as glycerol, trimethylolpropane, pentaerythritol, dipentaerythritol, etc or low molecular weight compounds of fatty acids with polyols and polycarboxylic acids. Examples of air drying non-fatty acid based non-volatile diluents are esters and ethers of allylic alcohols such as 2-hexenol, 2-ethylhexenol, 2,7-octadienol, nerol, geraniol and citronellol; terpene dimers derived from monoterpenes containing at least one double bond; citraconimides or itaconimides; commercial products sold under the names Dilulin™, Versadil™, or Radia™; etc. Typical examples of non-air drying non-volatile diluents are plasticisers.

In a preferred embodiment according to the invention the alkyd resin composition of the present invention is organic solvent-based, in which the solvent content in the coating composition comprises one or more organic solvents. The alkyd resin component (A) forms generally homogeneous solutions in such organic solvent medium. Examples of organic solvents include mineral spirits, benzene, xylene, naphtha type solvents, toluene, n-butyl acetate, isobutyl acetate, t-butyl acetate, n-propyl acetate, isopropyl acetate, ethyl acetate, methyl acetate, trimethylpentanediol mono-isobutyrate, ethylene glycol mono-octyl ether, diacetone alcohol, TEXANOL (D ester alcohol from Eastman Chemical Co.) and the like.

Other non-limiting examples of suitable organic solvents are aliphatic, cycloaliphatic, and aromatic hydrocarbons, alcohol ethers, and alcohol ether acetates or mixtures thereof. As examples of such solvents may be mentioned hydrocarbon solvents available under the trademarks Shellsol H, Shellsol K, and Shellsol AB, all from Shell Chemicals, the Netherlands; the trademarked Solvesso 150, Exxsol D30, Exxsol D40 and Exxsol D60 solvents from Esso; ester solvents such as ethyl diglycol, ethyl glycol acetate, butyl glycol, butyl glycol acetate, butyl diglycol, butyl diglycol acetate, and methoxypropylene glycol acetate; and ketone solvents like methyl ethyl ketone (MEK), acetone, methyl isobutyl ketone (MIBK), methyl isoamyl ketone and methyl amyl ketone (MAK). Mixtures of solvents may also be used. Preferably the solvent is an aliphatic solvent and most preferably the solvent is Exxsol D40.

Preferably the alkyd resin composition comprises ≤30 wt %, more preferably ≤20 wt % and most preferably ≤10 wt % organic solvent(s) based on the total alkyd resin composition.

In another embodiment according to the invention the ambient oxidative-cure coating composition of the present invention is water-based, wherein an aqueous liquid medium is defined as water or may also comprise water and one or more organic co-solvents that are partially or completely soluble in water.

Organic (co-)solvents that are partially or completely soluble in water suitable for the ambient oxidative-cure coating composition of the present invention are for example ethanol, propanol, butanol, propylene glycol, methoxypropylene glycol, dipropyleneglycol, dipropyleneglycol methylether, dipropyleneglycol dimethylether, ethyl diglycol, ethyl glycol acetate, butyl glycol, butyl glycol acetate, butyl diglycol, butyl diglycol acetate, and methoxypropylene glycol acetate; and ketone solvents like methyl ethyl ketone (MEK) and acetone. The aqueous system may also comprise surfactant to aid the dispersion of the alkyd resin component in the aqueous phase.

Preferably the alkyd resin composition comprises ≤10 wt %, more preferably ≤5 wt % and most preferably ≤1 wt % of organic (co-)solvents as described above, based on the total alkyd resin composition.

The alkyd resin component is dispersed in such aqueous ambient oxidative-cure coating compositions in the form of a particulate suspension, since it is substantially hydrophobic and therefore it does not dissolve well in aqueous mediums. In the drying process of such compositions, the aqueous medium evaporates and the particles will come to close contact with each other. The quality of the final coating is very much determined by the (partial) coalescence of the particles. Therefore, it is important to keep the inner phase of the particles as fluid as possible to promote coalescence in the final drying stage Additional embodiments of the invention are further described below.

In an embodiment, the invention relates to a method of preparing an auto-oxidative decorative coatings based on alpha, beta-unsaturated ester-functional alkyd resin compositions having improved drying properties, the method comprising adding to an alkyd resin component (A) a metal drier, a daylight photoinitiator and optionally a liquid medium as described above.

The composition of the invention may be combined with one or more than one additional polymeric resins. Combination may be by blending or an in situ preparation. Combination by blending may be by simple mixing under stirring or bringing the components together by an in-line mixing process.

The alkyd resin composition of the current invention may for example be used, appropriately formulated if necessary, for the provision of films, including inter alia polishes, varnishes, lacquers, or paints. The alkyd resin composition of the current invention may also be used for the provision of inks or adhesives.

The alkyd resin composition according to the invention may additionally include various additives includes conventional ingredients like pigments, dyes, wetting agents, dispersing and stabilising agents (usually surfactants or emulsifiers), antiskinning agents, rheology control agents, flow-promoting agents, extenders, defoaming agents, plasticisers, thickeners, heat stabilisers, levelling agents, anti-cratering agents, fillers, sedimentation inhibitors, UV absorbers, antioxidants, organic co-solvents, wetting agents, fungicides, bacteriocides, coalescents, waxes and the like introduced at any stage of the production process or subsequently. It is possible to include an amount of antimony oxide in the coating composition to enhance the fire retardant properties.

There is according to the invention further provided a method of coating the surfaces of a substrate using an alkyd resin composition according to the invention. The coating may be done by any conventional method including brushing, dipping, flow coating, spraying, flexo printing, gravure printing, any other graphic arts application methods and the like. The compositions once applied may be allowed to dry naturally at ambient temperature, or the drying process may be accelerated by heat.

Accordingly, in a further embodiment of the invention there is provided a coating or a polymeric film obtained from an alkyd resin composition according to the invention applied onto a substrate.

A further embodiment of the present invention provides a substrate fully or partially coated with a composition according to the invention. The alkyd resin composition of the invention may be applied to a variety of substrates including wood, board, metals such as aluminum or steel, stone, concrete, glass, cloth, leather, paper, plastics, polyester films such as polyethylene or polypropylene, urethane elastomers, primed (painted) substrates, foam and the like.

The present invention is now further illustrated but in no way limited by reference to the following examples. Unless otherwise specified all parts, percentages and ratios are on a weight basis.

Measuring Techniques
Viscosity

Viscosity values were measured with a Physica MCR301 rheometer using a cone/plate measuring system characterised by a cone diameter of 25 mm and a cone angle of 1°. Measurements were done at 23° C.

VOC

The determination of VOC was done as follows: first the specific weight of the paint ($kg/m^3$) was measured; then the solid content (%) was measured and then the VOC was calculated according to the formula:

$$VOC \text{ in } g/l=((100\text{-solids content})*density)/100$$

An alternative method to determine the VOC is ISO 11890-1: 2000(E).

The density of the compositions was measured according to ISO 2811-2: 1997(E).

The method to determine the volatile % was according to ISO 3251: 1993(E).

The Drying Properties

The cotton wool adhesion test measures the rate of surface drying of a coating film. The cotton wool adhesion test was conducted on a coating film applied with a 100 μm slit applicator on a glass plate. After applying the coating composition, a swatch of cotton wool (a loose ball of approximately 0.2 g and a diameter of approximately 3 cm) was dropped from a height of 5 cm on the paint film. After 10 seconds the glass panel was turned over 180° and it was observed if the cotton wool dropped off without leaving cotton fibres on the surface. When the cotton wool did not stick to the surface, the time was recorded as the dust free time. For the tack free time the same procedure was used, but now a weight of 1 kg was placed on the cotton wool. The tack free time was always determined after dust-free properties were reached.

Molecular Weights

The molecular weights referred to in this application are the values as determined on an Alliance Waters 2695 GPC with two consecutive PL-gel columns, type Mixed-C, l/d=300/7.5 mm (Polymer Laboratories), size of column particles 10 μm, using stabilised tetrahydrofuran (THF) modified with 0.8% acetic acid as the eluent at 1 mL/min at 40° C. and using an Alliance Waters 2414 refractive index detector at 40° C. A set of polystyrene standards with a molecular weight range of 162 to $7.10^6$ g/mol was used to calibrate the GPC equipment.

Preparation of a Methacrylate Functional Alkyd Resin (Resin A)

1469 g of soybean fatty acid, 393 g of pentaerythritol and 273 g of phtalic anhydride were charged to the reactor and heated to 240° C. under xylene reflux conditions. The temperature was maintained at 240° C. for 3 hours, when an acid value of less than 5 mg KOH/g was reached. The reactor was cooled to 160° C. and 221 g of trimellitic anhydride was charged to the reactor. The reactor was heated to 220° C. under azeotropic conditions and the distillation was stopped when the acid value reached 50 mg KOH/g resin. The reactor was then cooled to 170° C. and vacuum distillation was started until the acid value reached 45 mg KOH/g resin. Then, the reactor was cooled to 150° C. and 187 g of glycidyl methacrylate was added. The reactor was kept at 150° C. for 2 hours until an acid value of 8.0 mg KOH/g was reached. 267 g of Exxsol D40 solvent was added.

Preparation of a Methacrylate Functional Polyesteramide Alkyd Resin (Resin B)

557 g of soybean fatty acid, 234 g of diisopropanolamine and 203 g of hexahydrophtalic anhydride were charged to the reactor and heated to 160° C. under methylcyclohexane reflux conditions. The temperature was maintained at 160° C. for 3.5 hours, when an acid value of 14.6 mg KOH/g was reached. 75 g methacrylic acid and 0.22 g phenothiazine were added at 120° C. and reflux esterification was continued at 140-150° C. for 13 hours.

The reactor was then cooled to 130° C. and vacuum distillation was performed for complete methylcyclohexane removal. Then, the reactor was discharged after cooling down. Some resin data are collected in table 1.

Preparation of a Sorbate Functional Polyesteramide Alkyd Resin (Resin C)

557 g of soybean fatty acid, 234 g of diisopropanolamine and 203 g of hexahydrophtalic anhydride were charged to the reactor and heated to 160° C. under methylcyclohexane reflux conditions. The temperature was maintained at 160° C. for 3.0 hours, when an acid value of 10.1 mg KOH/g was reached. 92 g sorbic acid and 0.5 g butylated hydroxytoluene were added at 100° C. and reflux esterification was continued at 140-150° C. for 17 hours.

The reactor was then cooled to 130° C. and vacuum distillation was performed for complete methylcyclohexane removal. Then, the reactor was discharged after cooling down. Some resin data are collected in table 1.

Preparation of a Polyesteramide Alkyd Resin (Resin D)

552 g of soybean fatty acid, 213 g of dehydrated castor oil fatty acids, 230 g of diisopropanolamine and 199 g of hexahydrophtalic anhydride were charged to the reactor and heated to 160° C. under methylcyclohexane reflux conditions. The temperature was maintained at 160° C. for 12 hours, when an acid value of 9.2 mg KOH/g was reached.

The reactor was then cooled to 140° C. and vacuum distillation was performed for complete methylcyclohexane removal. Then, the reactor was discharged after cooling down. Some resin data are collected in table 1.

Preparation of a Methacrylate Functional Polyesteramide Alkyd Resin (Resin E)

377 g of soybean fatty acid, 221 g of dehydrated castor oil fatty acids, 223 g of diisopropanolamine and 194 g of hexahydrophtalic anhydride were charged to the reactor and heated to 160° C. under methylcyclohexane reflux conditions. The temperature was maintained at 160° C. for 3 hours, when an acid value of 14.1 mg KOH/g was reached. 52 g methacrylic acid and 0.21 g phenothiazine were added at 120° C. and reflux esterification was continued at 150° C. for 13 hours.

The reactor was then cooled to 130° C. and vacuum distillation was performed for complete methylcyclohexane removal. Then, the reactor was discharged after cooling down. Some resin data are collected in table 1.

Preparation of a Crotonate Functional Polyesteramide Alkyd Resin (Resin F)

414 g of soybean fatty acid, 185 g of conjugated soybean fatty acids, 223 g of diisopropanolamine and 194 g of hexahydrophtalic anhydride were charged to the reactor and heated to 160° C. under methylcyclohexane reflux conditions. The temperature was maintained at 160° C. for 3 hours, when an acid value of 19.6 mg KOH/g was reached. 52 g crotonic acid was added at 100° C. and reflux esterification was continued at 160° C. for 10 hours.

The reactor was then cooled to 130° C. and vacuum distillation was performed for complete methylcyclohexane removal. Then, the reactor was discharged after cooling down. Some resin data are collected in table 1.

Preparation of a Methacrylate Functional Polyesteramide Alkyd Resin (Resin G)

414 g of soybean fatty acid, 185 g of conjugated soybean fatty acids, 223 g of diisopropanolamine and 194 g of hexahydrophtalic anhydride were charged to the reactor and heated to 160° C. under methylcyclohexane reflux conditions. The temperature was maintained at 160° C. for 2 hours, when an acid value of 23 mg KOH/g was reached. 52 g methacrylic acid and 0.21 g phenothiazine were added at 120° C. and reflux esterification was continued at 150° C. for 16 hours.

The reactor was then cooled to 130° C. and vacuum distillation was performed for complete methylcyclohexane removal. Then, the reactor was discharged after cooling down. Some resin data are collected in table 1.

TABLE 1

Resin characteristics

| Resin code | Resin functionalised with: | % functionality in alkyd resin component | Oil Content % | Conjugated FA % | Mn Da | Mw Da | Viscosity Pas |
|---|---|---|---|---|---|---|---|
| A | Glycidyl methacrylate | 7.4 | 63 | 0 | 3038 | 11489 | n.a. |
| B | Methacrylic acid | 7.6 | 58 | 0 | 1857 | 4044 | 15.7 |
| C | Sorbic acid | 9.1 | 58 | 0 | 2093 | 5294 | 55 |
| D* | None | 0 | 71 | 8 | 2168 | 3980 | 5.4 |
| E | Methacrylic acid | 5.2 | 63 | 8 | 2056 | 4383 | 17.4 |
| F | Crotonic acid | 5.2 | 63 | 10 | 1957 | 3802 | 16.8 |
| G | Methacrylic acid | 5.2 | 63 | 10 | 2146 | 4783 | 19.8 |

Resin D was a comparative resin having no alpha, beta unsaturated ester moieties.

Non-volatile, Auto-oxidisable Diluent

A diluent was prepared according to the following process: 1108 g of soya fatty acid, 160 g of dipentaerythritol and 50 g of xylene were charged to a reactor and heated to 250° C. under azeotropic conditions. Distillation was stopped when the acid value reached 10 mg KOH/g. Finally, the xylene was stripped under vacuum conditions at 200° C. Thereafter, the resulting diluent was discharged and used for the examples.

EXAMPLES

Example 1

Composition Based on Conventional Alkyd Component

Coating compositions 1 were obtained by mixing with a normal lab stirrer 29 g of solid resin A with 21 g diluent described above, 2.87 g Nuodex Ca 5 (Elementis), 0.42 g Nuodex Co 10 (Elementis), 2.18 g Nuodex Zr 12 (Elementis) and 0.6 g Exkin 2 (Elementis). Optionally daylight photoinitiator (PI) combinations of camphorquinone (CQ) 0.5 g with Ethyl 4-dimethylaminobenzoate 0.5 g were added. Compositions were diluted to 0.6-0.7 Pa·s with Exxsol D40 giving clear paints. VOC was calculated at 240 g/l and drying properties were determined with the following results:

TABLE 2

| Example | Resin code | PI type | Drying rate without PI | | Drying rate with PI | |
|---|---|---|---|---|---|---|
| | | | Dust free hrs | Tack free hrs | Dust free hrs | Tack free hrs |
| 1 | A | CQ | 2:45 | 3:00 | 2:15 | 2:30 |

Examples 2-6

Compositions Based on Polyesteramide Alkyds

Coating compositions 2-6 were obtained by mixing with a normal lab stirrer 50 g of solid resin B to F with 2.87 g Nuodex Ca 5 (Elementis), 0.42 g Nuodex Co 10 (Elementis), 2.18 g Nuodex Zr 12 (Elementis) and 0.6 g Exkin 2 (Elementis). Optionally daylight PI combinations of camphorquinone 0.5 g with Ethyl 4-dimethylaminobenzoate 0.5 g were added. Compositions were diluted to 0.6-0.7 Pa·s with Exxsol D40 giving clear paints. VOC was calculated and drying properties determined with the following results:

TABLE 3

| Example | Resin code | VOC g/l | Drying rate without PI | | Drying rate with PI | |
|---|---|---|---|---|---|---|
| | | | Dust free hrs | Tack free hrs | Dust free hrs | Tack free hrs |
| 2 | B | 170 | 6:30 | 7:00 | 3:00 | 4:00 |
| 3 | C | 230 | >7:00 | >7:00 | 2:30 | 3:00 |
| C4* | D | 130 | 4:30 | 6:30 | 3:30 | 6:00 |
| 5 | E | 190 | 5:00 | 5:30 | 3:00 | 4:00 |
| 6 | F | 160 | 4:30 | 6:30 | 3:30 | 5:30 |

*C4 is a comparative example.

The resins B-F above, except comparative resin D, were functionalized with alpha, beta-unsaturated ester moieties according to table 1 above.

Examples 7-8

Influence of Daylight Initiator on the Coating Drying Properties

Coating compositions 7-8 were obtained by mixing with a normal lab stirrer 18 g of solid resin G with 32 g Sefose (P&G), 2.87 g Nuodex Ca 5 (Elementis), 0.42 g Nuodex Co 10 (Elementis), 2.18 g Nuodex Zr 12 (Elementis) and 0.6 g Exkin 2 (Elementis). Optionally daylight PI combinations of camphorquinone (CQ) 0.5 g or benzyl 0.5 g with Ethyl 4-dimethylaminobenzoate 0.5 g were added. Compositions were clear paints at 0.6-0.7 Pa·s. VOC was calculated at 50 g/l and drying properties were determined with the following results:

TABLE 4

| Example | Resin code | PI type | Drying rate without PI | | Drying rate with PI | |
|---|---|---|---|---|---|---|
| | | | Dust free hrs | Tack free hrs | Dust free hrs | Tack free hrs |
| 7 | G | CQ | 4:00 | 4:30 | 2:45 | 3:15 |
| 8 | G | Benzyl | 4:00 | 4:30 | 3:15 | 3:45 |

Both camphorquinone and benzyl ensured a very good dust free and tack free drying time.

Examples 9-11

Influence of Pigment on the Coating Drying Properties

Coating composition 9 was obtained by mixing with a normal lab stirrer 18 g of solid resin E with 32 g Sefose (P&G), 2.87 g Nuodex Ca 5 (Elementis), 0.42 g Nuodex Co 10 (Elementis), 2.18 g Nuodex Zr 12 (Elementis) and 0.6 g Exkin 2 (Elementis). Optionally a daylight Pl combination of camphorquinone (CQ) 0.5 g with Ethyl 4-dimethylaminobenzoate 0.5 g was added. Compositions were clear paints at 0.6-0.7 Pa·s with VOC=60 g/l. Further paints with same binder composition and containing titanium dioxide at PVC 8% or full tone black pigment paste were prepared with and without the same PI combination at VOC's 75 g/l and 90 g/l respectively. They showed the following drying properties:

TABLE 5

| Example | Resin code | pigment | Drying rate without PI | | Drying rate with PI | |
|---|---|---|---|---|---|---|
| | | | Dust free hrs | Tack free hrs | Dust free hrs | Tack free hrs |
| 9 | G | none | 4:45 | 5:15 | 3:30 | 4:00 |
| 10 | G | white | 5:00 | 5:15 | 3:30 | 4:00 |
| 11 | G | black | 4:20 | 5:10 | 3:45 | 4:15 |

Clearly, the dust free and tack free drying times were very good when using a daylight photoinitiator even in the presence of various pigments. This is surprising since pigment may in principle minimise the photoinitiator activity by reflecting the light back from the pigmented coating surface.

The invention claimed is:
1. An alkyd resin composition comprising components:
(A) at least one auto-oxidisable alkyd resin component comprising unsaturated fatty acid or its derivative, wherein the alkyd resin is a polyesteramide alkyd which is a reaction product of:

(i) 10 to 40 wt. % of a cyclic anhydride;
(ii) 10 to 40 wt. % of an alkanolamine; and
(iii) 30 to 80 wt. % of fatty acid based on the total amount of the polyesteramide alkyd; wherein the alkyd has an oil length of at least 20% unsaturated fatty acids;
(B) a daylight photoinitiator;
(C) a metal drier; and
(D) optionally a liquid medium selected from the group consisting of an organic solvent, water, non-volatile diluent and mixtures thereof; wherein
if the liquid medium is present and is: a) substantially based on organic solvent and/or diluent then the VOC is <300 g/l, or b) substantially based on water then the VOC is <100 g/l.

2. The alkyd resin composition according to claim 1, wherein the alkyd resin component further comprises an α,β-unsaturated ester functional alkyd resin having the following structure:

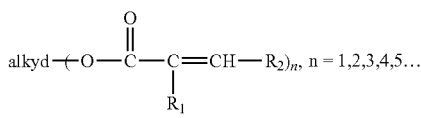

wherein one of R1 or R2 is H and the other is C1 to C8 alkyl or C2 to C4 alkylene.

3. The alkyd resin composition according to claim 1, wherein the alkyd resin component further comprises an α,β-unsaturated ester functional alkyd resin which is a polyesteramide alkyd resin and comprises the reaction product of a hydroxyl-functional alkyd resin, and an α,β-unsaturated carboxylic acid, wherein the acid moiety of the α,β-unsaturated carboxylic acid is the reactive moiety and the reaction product contains terminal and/or pendant reactive α,β-unsaturated ester functional groups.

4. The alkyd resin composition according to claim 1, wherein the alkyd resin component further comprises an α,β-unsaturated ester functional alkyd resin which is the reaction product of:
(a1) 85 to 98 wt % of a carboxyl-functional alkyd resin; and
(a2) 2 to 15 wt % of an epoxy functional α,β-unsaturated ester, wherein the epoxy moiety of is the reactive moiety and the reaction product contains terminal and/ or pendant reactive methacrylate functional groups.

5. The alkyd resin composition according to claim 4, wherein the carboxyl-functional alkyd resin comprises the reaction product of:
(a) 0 to 30 wt % of one or more diol(s);
(b) 10 to 40 wt % of one or more polyol(s);
(c) 5 to 40 wt % of one or more polyacid(s);
(d) 0 to 15 wt % of one or more monofunctional acid(s) or hydroxyacid(s);
(e) 30 to 80 wt % of one or more fatty acid(s), fatty ester(s), or naturally occurring oil(s); and (f) 0 to 1 wt % of a catalyst;
where (a)+(b)+(c)+(d)+(e)+(f) make up 100%.

6. The alkyd resin composition according to claim 1, wherein the alkyd resin component comprises a urethane modified alkyd resin.

7. The alkyd resin composition according to claim 2, wherein the composition comprises in total up to 25% of alpha, beta-unsaturated ester groups on resin solids.

8. The alkyd resin composition according to claim 1 comprising from 100 to 10,000 ppm of dissolved metal in the metal drier by weight of total resin solids.

9. The alkyd resin composition according to claim 1, wherein:
the alkyd resin composition (1) is present in an amount of from 30 to 98 wt %;
the drier (2) is present in an amount of from 0.01 to 5 wt % of metal; and
the photoinitiator (3) present in an amount of from 0.1 to 5 wt %, where components (1)+(2)+(3) and further additives make up 100%.

10. The alkyd resin composition according to claim 4, wherein the epoxy functional α,β-unsaturated ester is an epoxy methacrylate.

11. A method of preparing an alkyd resin composition, comprising mixing:
(A) at least one auto-oxidizable alkyd resin component comprising an unsaturated fatty acid or its derivative, wherein the alkyd resin is a polyesteramide alkyd which is the reaction product of:
(i) 10 to 40 wt. % of a cyclic anhydride;
(ii) 10 to 40 wt. % of an alkanolamine; and
(iii) 30 to 80 wt. % of fatty acid based on the total of the polyesteramide alkyd; wherein the alkyd has an oil length of at least 20% unsaturated fatty acids;
(B) a daylight photoinitiator;
(C) a metal drier; and
(D) optionally a liquid medium selected from the group consisting of an organic solvent, water, non-volatile diluent and mixtures thereof.

12. A method according to claim 11, further comprising the steps of:
1) reacting either
a) (i) a carboxyl-functional alkyd resin, and (ii) an epoxy functional α,β-unsaturated ester, wherein the epoxy moiety of the alpha, beta-unsaturated ester is the reactive moiety and the reaction product contains terminal and/or pendant reactive alpha, beta-unsaturated ester functional groups, to obtain an alpha, beta-unsaturated ester-functional alkyd resin; or
b) (i) a carboxyl-functional alkyd resin, and (ii) an α,β-unsaturated carboxylic acid wherein the acid moiety of the α,β-unsaturated carboxylic acid is the reactive moiety and the reaction product contains terminal and/or pendant reactive α,β-unsaturated ester functional groups, to obtain an α,β-unsaturated ester functional alkyd resin; and
2) adding said alpha, beta-unsaturated ester-functional alkyd resin to:
a) the auto-oxidizable alkyd resin component;
b) the at least one drier,
c) the daylight photoinitiator, and
d) the optional liquid medium.

13. A surface coated with a composition according to claim 1.

14. An indoor or outdoor coating material which comprises the alkyd resin composition according to claim 1.

* * * * *